(12) United States Patent
Maeng et al.

(10) Patent No.: US 10,964,202 B2
(45) Date of Patent: Mar. 30, 2021

(54) HOME MONITORING SYSTEM

(71) Applicant: LG ELECTRONICS INC., Seoul (KR)

(72) Inventors: Jichan Maeng, Seoul (KR); Beomoh Kim, Seoul (KR); Wonho Shin, Seoul (KR); Taehyun Kim, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/656,475

(22) Filed: Oct. 17, 2019

(65) Prior Publication Data

US 2020/0051422 A1 Feb. 13, 2020

(30) Foreign Application Priority Data

Aug. 2, 2019 (KR) .................. 10-2019-0094582

(51) Int. Cl.
*G08B 31/00* (2006.01)
*H04L 29/08* (2006.01)
*H04W 4/021* (2018.01)
*G08B 21/02* (2006.01)
*G06K 9/00* (2006.01)
*H04N 5/247* (2006.01)
*H04N 7/18* (2006.01)
*H04W 72/04* (2009.01)
*G06K 9/62* (2006.01)

(52) U.S. Cl.
CPC ......... *G08B 31/00* (2013.01); *G06K 9/00342* (2013.01); *G08B 21/02* (2013.01); *G08B 21/0225* (2013.01); *H04L 67/125* (2013.01); *H04N 5/247* (2013.01); *H04N 7/181* (2013.01); *H04W 4/022* (2013.01); *H04W 72/042* (2013.01); *G06K 9/6257* (2013.01); *G06K 9/6263* (2013.01)

(58) Field of Classification Search
CPC .... G08B 31/00; G08B 21/0225; G08B 21/02; H04W 72/042; H04W 4/022; H04W 4/70; H04N 7/181; H04N 5/247; H04N 5/23206; H04N 5/23222; H04N 5/23219; G06K 9/00342; G06K 9/6263; G06K 9/6257; G06K 9/00771; H04L 67/125; H04L 67/12
See application file for complete search history.

(56) References Cited

U.S. PATENT DOCUMENTS 9,300,581 B1 * 3/2016 Hui ................... H04L 45/742
10,276,017 B2 * 4/2019 Caperell .............. G08B 21/22
(Continued)

*Primary Examiner* — Fernando Alcon
(74) *Attorney, Agent, or Firm* — Lee, Hong, Degerman, Kang & Waimey

(57) ABSTRACT

A home monitoring system according to an aspect of the present disclosure relates to a home monitoring system and, more particularly, to a home monitoring system that can prevent a safety accident when a child or a pet approaches a predetermined dangerous space or a home IoT device, by sensing it, controlling the home IoT device, and making a user recognize it. According to the home monitoring system of the present disclosure, one or more of an IoT device and a server of the present disclosure may be associated with an artificial intelligence module, a robot, an AR (Augmented Reality) device, a VR (Virtual Reality) device, a device associated with 5G services, etc.

19 Claims, 15 Drawing Sheets

(56) References Cited

U.S. PATENT DOCUMENTS

| | | | |
|---|---|---|---|
| 2004/0190767 A1* | 9/2004 | Tedesco | H04L 67/12 382/156 |
| 2013/0011014 A1* | 1/2013 | Jin | G08B 13/19645 382/103 |
| 2013/0141543 A1* | 6/2013 | Choi | G08B 13/19667 348/47 |
| 2014/0211003 A1* | 7/2014 | Lee | G06K 9/00778 348/143 |
| 2016/0134932 A1* | 5/2016 | Karp | H04N 5/23254 348/155 |
| 2017/0261970 A1* | 9/2017 | Fujimura | G05B 19/058 |
| 2018/0151045 A1* | 5/2018 | Kim | G08B 13/1965 |
| 2018/0302412 A1* | 10/2018 | Achtermann | H04L 41/0893 |
| 2018/0338241 A1* | 11/2018 | Li | G08B 21/24 |
| 2019/0020530 A1* | 1/2019 | Au | H04W 72/0413 |

\* cited by examiner

HOME MONITORING SYSTEM

CROSS-REFERENCE TO RELATED APPLICATIONS

Pursuant to 35 U.S.C. § 119(a), this application claims the benefit of earlier filing date and right of priority to Korean Patent Application No. 10-2019-0094582, filed on Aug. 2, 2019, the contents of which are hereby incorporated by reference herein in its entirety.

BACKGROUND OF THE INVENTION

Field of the Invention

The present disclosure relates to a home monitoring system and, more particularly, to a home monitoring system that can prevent a safety accident when a child or a pet approaches a predetermined dangerous space or a home IoT device, by sensing it, controlling the home IoT device, and making a user recognize it.

Related Art

Recently, the smart home environment is continuously expanding with popularization of IoT (Internet of Things) home appliances based on an intelligent wireless sensor network. Development of the IoT technology enables customers to use various smart home appliances.

Through combination of IoT and smart home appliances, services based on the smart home environment have expanded to safety management. Recently, a technology using physical security equipment is representative of the safety management technology for protecting the residents at home.

As home physical security, there are representative technologies of individual identification for personal safety of residents and for safe management environment construction of home facilities, and an image monitoring solution, bio recognition, object recognition-unmanned electronic security, an intelligent camera, etc. as security technologies for image monitoring and for preventing disasters or calamities.

A home safety system based on the home physical security technology provides services such as a home inside monitoring, safety accident informing, etc. to protect residents.

The services based on the home safety management technology in the related art are mostly services for providing simple monitoring or post measures. In particular, a monitoring service using a home CCTV camera provides limitative and intermittent observation focusing on spaces, so continuous safety management focusing on residents is difficult. This simple monitoring and post measure service has limitation in prevent occurrence of safety accidents in a home.

Accordingly, in order to improve safety for residents in a home, it is required to develop an efficient safety management system for continuous safety management and safety accident prevention including post measures.

SUMMARY OF THE INVENTION

An object of the present disclosure is to solve the necessities and/or problems described above.

Further, an object of the present disclosure is to provide a home monitoring system that can prevent a safety accident when a child or a pet approaches a predetermined dangerous space or a home IoT device, by sensing it, controlling the home IoT device, and making a user recognize it.

A home monitoring system according to an aspect of the present disclosure includes: a plurality of home IoT devices disposed in an internal space; a plurality of cameras that photographs the internal space and surroundings of the plurality of home IoT devices; and a home IoT server that receives internal images of the internal space photographed by the plurality of cameras and images photographed around the surroundings of the plurality of home IoT devices, and transmits control signals that can control the plurality of home IoT devices to the plurality of home IoT devices, in which the home IoT server sets a surrounding space around some home IoT device of surrounding spaces of the plurality of home IoT devices and some space of the internal space as a dangerous space, and controls the some home IoT device by transmitting a safety signal to the some home IoT device and transmits a warning signal to a registered user when sensing a person included in a predetermined range and approaching the dangerous space n the internal images.

Further, the home IoT server may include: a communication unit that receives the internal images or the surrounding images from the plurality of cameras, transmits the control signal or the safety signal to the plurality of home IoT devices, and transmits a warning signal the registered user; a main controller that sets the some space and the surrounding spaces as the dangerous space on the basis of the internal images transmitted through the communication unit, acquires approach information related to a situation in which a person included in a predetermined range approaches the set dangerous space, applies the approach information to a danger-possible situation determination classification model learned in advance, determines whether the situation in which the approach information has been recognized is a dangerous situation on the basis of the applying result, and generates the safety signal or the warning signal on the basis of the determining result; and a storage unit that stores the internal images, the surrounding images, the safety signal, or the warning signal, and the communication unit may transmit the safety signal to the some home IoT device to control operation of the some home IoT device or transmits the warning signal to the registered user under control by the main controller.

Further, the main controller may determine whether to set the dangerous space, depending on the operation of the some home IoT device.

Further, the main controller may not set the surrounding space of the some home IoT device as a dangerous space when the some home IoT device is not operated, and may set the surrounding space of the some home IoT device as the dangerous space when the some home IoT device is operated.

Further, the some home IoT device may include one of an electric range, a gas stove, a dish washing machine, an oven, and a washing machine.

Further, the some space may include a space where the some home IoT device is installed and a space where a window is installed.

Further, the person included in the predetermined range may include a child or an old or weak person.

Further, the main controller may acquire movement information related to a situation in which the person included in the predetermined range moves on the basis of the internal images, may apply the movement information to a warning-possible situation determination classification model learned in advance, may determine whether the situation in which the movement information has been recognized is a warning situation on the basis of the applying result, and may generate the safety signal or the warning signal on the basis of the determining result.

Further, the main controller may select one of the home IoT devices, which the person included in the predetermined range uses at least three or more times a day, as a preferring IoT device on the basis of the internal images, and may control the preferring home IoT device to forcibly operate when it is sensed that the person included in the predetermined range stays in the dangerous space over a predetermined time or approaches into a safety distance of the some home IoT device.

Further, when it is sensed that the person included in the predetermined range stays in the dangerous space over a predetermined time or approaches into the safety distance of the some home IoT device, the controller may select one of the plurality of cameras and may control the camera to zoom in and photograph the person included in the predetermined range.

Further, the warning signal may include a voice of the registered user stored in the storage unit.

Further, the registered user may be a user whose phone number about a portable device has been registered on the home IoT server.

Further, the danger-possible situation determination classification model may be stored in an AI (Artificial Intelligence) device, and the main controller may transmit a feature value related to information related to the situation in which the approach information has been recognized to the AI device, and may acquire a result of applying the information related to the situation in which the approach information has been recognized to the danger-possible situation determination classification model from the AI device.

Further, the danger-possible situation determination classification model may be stored in a network, and the main controller may transmit information related to the situation in which the approach information has been recognized to the network, and may acquire a result of applying the information related to the situation in which the approach information has been recognized to the danger-possible situation determination classification model from the network.

Further, the main controller may receive DCI (Downlink Control Information) that is used to schedule transmission of the information related to the situation in which the approach information has been recognized from a network, and the information related to the situation in which the approach information has been recognized may be transmitted to the network on the basis of the DCI.

Further, the main controller may perform a procedure of initial connection with the network on the basis of an SSB (Synchronization signal block), the information related to the situation in which the approach information has been recognized may be transmitted to the network through a PUSCH, and DM-RS of the SSB and the PUSCH may have undergone QCL for a QCL type D.

Further, the main controller may control the communication unit to transmit the information related to the situation in which the approach information has been recognized to the AI processor included in the network, and may control the communication to receive AI-processed information from the AI processor, and the AI-processed information may be dangerous situation probability information for determining whether the situation in which the approach information has been recognized is a dangerous situation.

Further, the main controller may determine whether to set the dangerous space, depending on the state of the window.

Further, the main controller may not set the some space as the dangerous space when the window is closed and locked, and may set the some space as the dangerous space when the window is open and unlocked.

Further, the main controller may reset the some space as the dangerous space and generate the warning signal when the window is locked and is not set as the dangerous space and the person included in the predetermined range touches or unlocks the window.

Accompanying drawings included as a part of the detailed description for helping understand the present disclosure provide embodiments of the present disclosure and are provided to describe technical features of the present disclosure with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
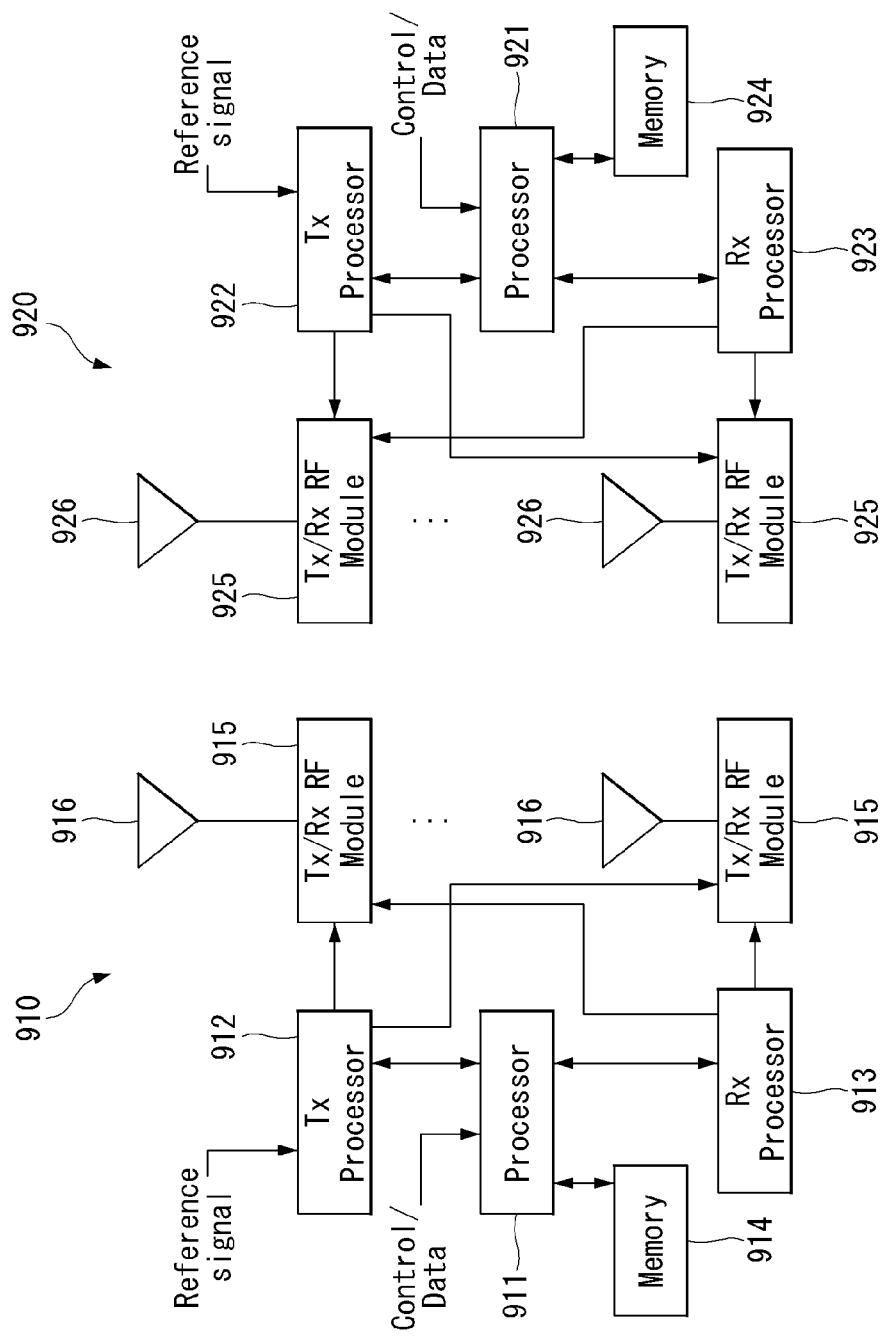
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
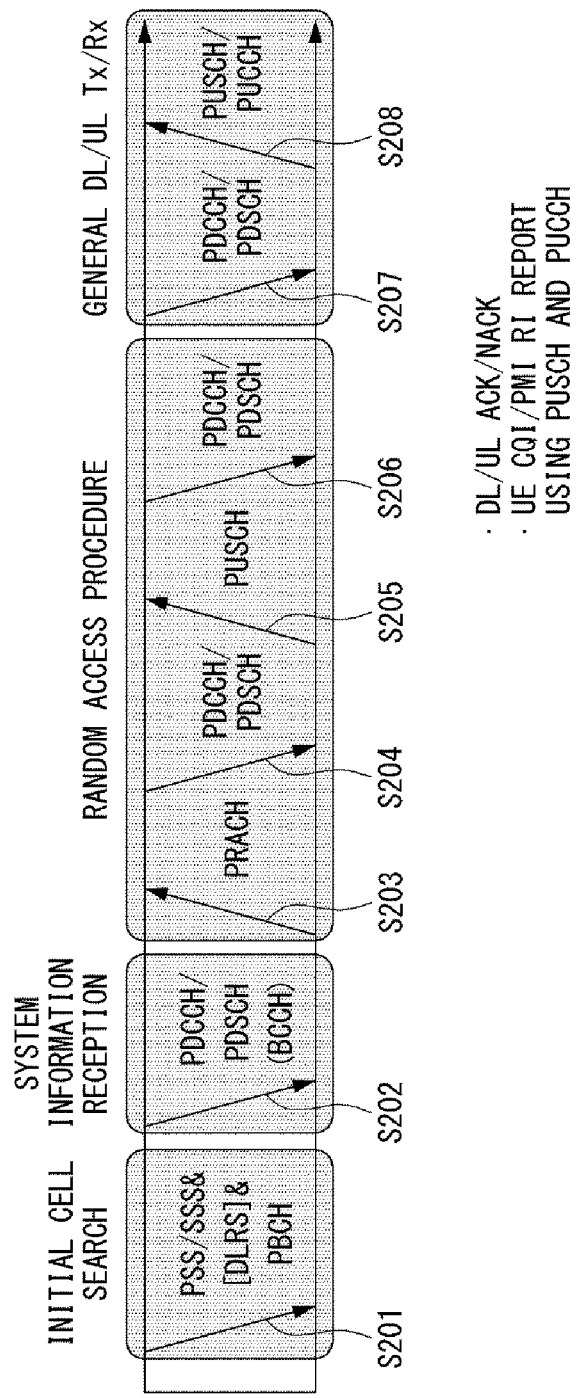
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each 01-DM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
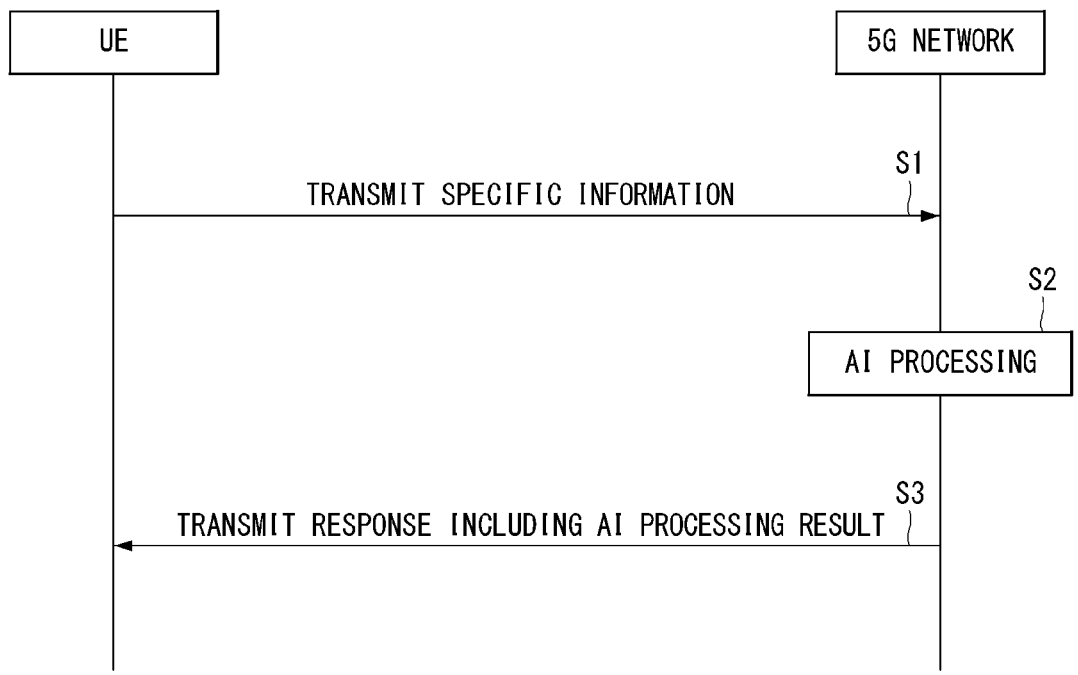
FIG. 3 shows an example of basic operations of a user equipment and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Hereinafter, in the present disclosure, the home IoT server may be defined as a device capable of entirely controlling a plurality of home appliances or home IoT devices disposed inside the home, and the home IoT devices may be defined as devices that can be controlled by the home IoT server.

Figure 4:
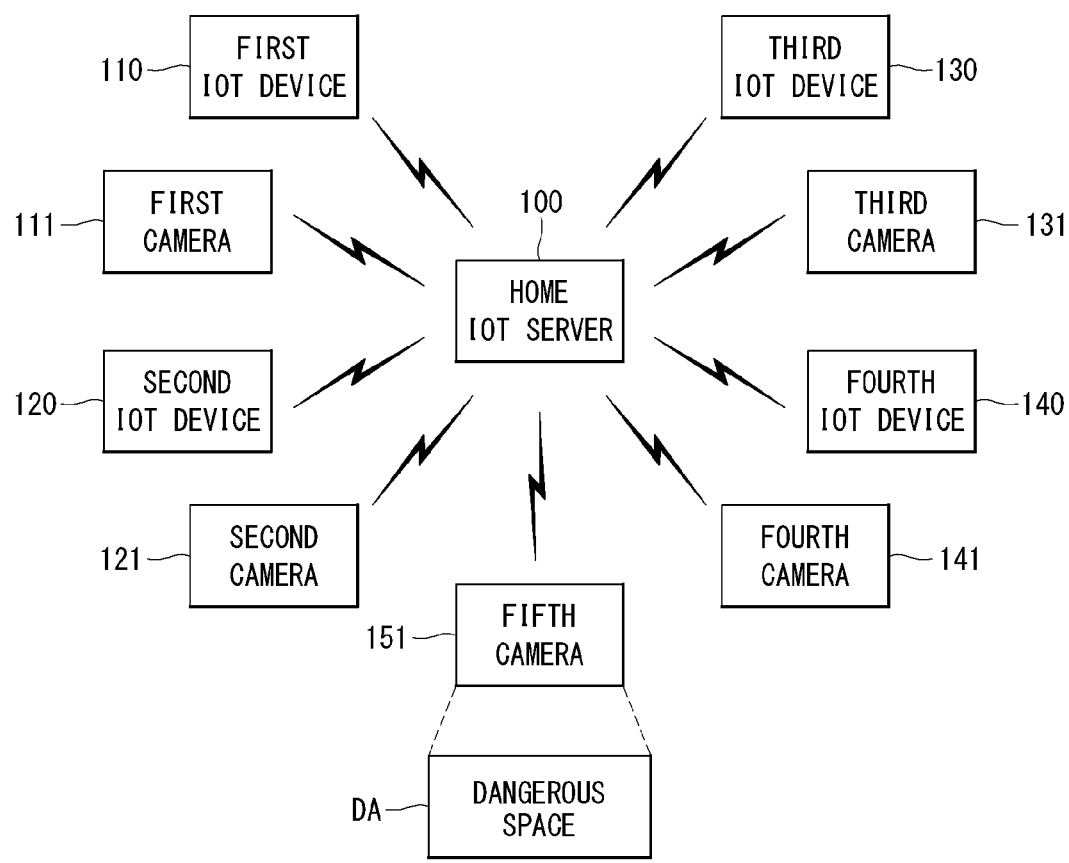
FIG. 4 is a diagram showing a home IoT system according to an embodiment of the present disclosure.

FIG. 4 is a diagram showing a home monitoring system according to an embodiment of the present disclosure.

As shown in FIG. 4, according to an embodiment of the present disclosure, a home monitoring system may include a plurality of home IoT devices 110 to 140, a plurality of cameras 111 to 151, and a home IoT server 100.

The plurality of home IoT devices 110 to 140 may be disposed in an internal space. The plurality of home IoT devices 110 to 140 may be various home appliances that are disposed in a home. For example, the plurality of home IoT devices 110 to 140 includes a flat panel display device, a washing machine, a refrigerator, a gas stove, an electric range, a robot cleaner, a styler, an electric rice cooker, a boiler, a smartphone, a vehicle, etc., and all the objects can be connected to a 5G network. The plurality of home IoT devices 110 to 140 is given a communication and sensor functions, so they can transmit/receive data by themselves, can process the data, and can be automatically driven.

The plurality of home IoT devices 110 to 140 may include a first home IoT device 110 to a fourth home IoT device 140.

The plurality of cameras 111 to 151 can photograph an internal space and the surroundings of the plurality of home IoT devices 110 to 140. The plurality of cameras 111 to 151 may include a first camera 111 to a fifth camera 151. The first camera 111 can photograph a surrounding space around the first home IoT device 110. The second camera 121 can photograph a surrounding space around the second home IoT device 120. The third camera 131 can photograph a surrounding space around the third home IoT device 130. The fourth camera 141 can photograph a surrounding space around the fourth home IoT device 140. The fifth camera 151 can photograph a dangerous space DA in the internal space. For example, the dangerous space DA may be a space such as a window and a veranda. The fifth camera 151 may be disposed around a dangerous space DA set by a user.

The home IoT server 100 can receive internal images of the internal space photographed by the plurality of cameras 111 to 151 and images photographed around the surrounding spaces of the plurality of home IoT devices 110 to 140, and can transmit control signals that can control the plurality of home IoT devices 110 to 140 to the plurality of home IoT devices 110 to 140.

The home IoT server can set surrounding spaces around some home IoT devices 110 to 140 of surrounding spaces of the plurality of home IoT devices 110 to 140 and some space of the internal space as a dangerous space DA, and can control some home IoT devices 110 to 140 by transmitting a safety signal to them and can transmit a warning signal to a registered user when sensing a person included in a predetermined range and approaching the dangerous space DA in the internal images.

Figure 5:
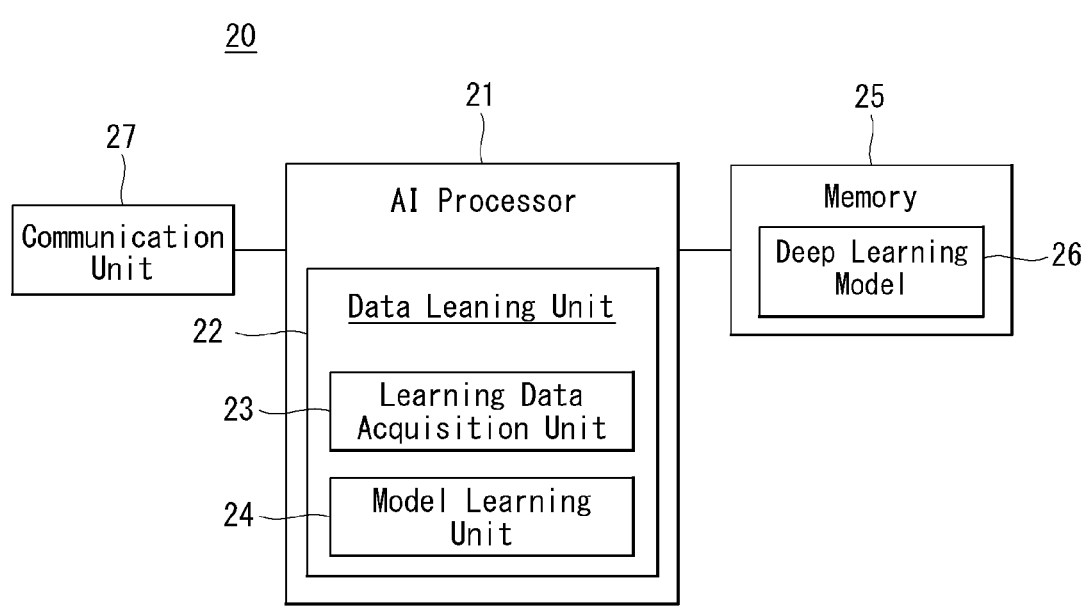
FIG. 5 is a block diagram of an AI device according to an embodiment of the present disclosure.

FIG. 5 is a block diagram of an AI device according to an embodiment of the present disclosure.

An AI device 20 may include an electronic device including an AI module that can perform AI processing, a server including the AI module, or the like. Further, the AI device 20 may be included as at least one component of the home IoT devices 110 shown in FIG. 4 to perform together at least a portion of the AI processing.

The AI processing may include all operations related to control of the home IoT server 100 shown in FIG. 4. For example, the home IoT server 100 can perform processing/determining, and control signal generating operations by performing AI processing on sensing data transmitted from the plurality of home IoT devices 110 to 140, or acquired data. Further, for example, the home IoT server 100 can control the plurality of home IoT devices 110 to 140 by performing AI processing on data received through a communication unit.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, data about a home IoT server and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Examples of the external electronic device may include a home IoT device, a robot, a drone, an AR device, a mobile device, a home appliance, and the like.

For example, when the external electronic device is a home IoT device, the AI device 20 may be defined as a home IoT device that communicates with the home IoT server, or another home IoT device or a 5G network. Meanwhile, the AI device 20 may be implemented by being functionally embedded in a processor included in a home IoT server. Further, the 5G network may include a server or a module that performs AI processing.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 6:
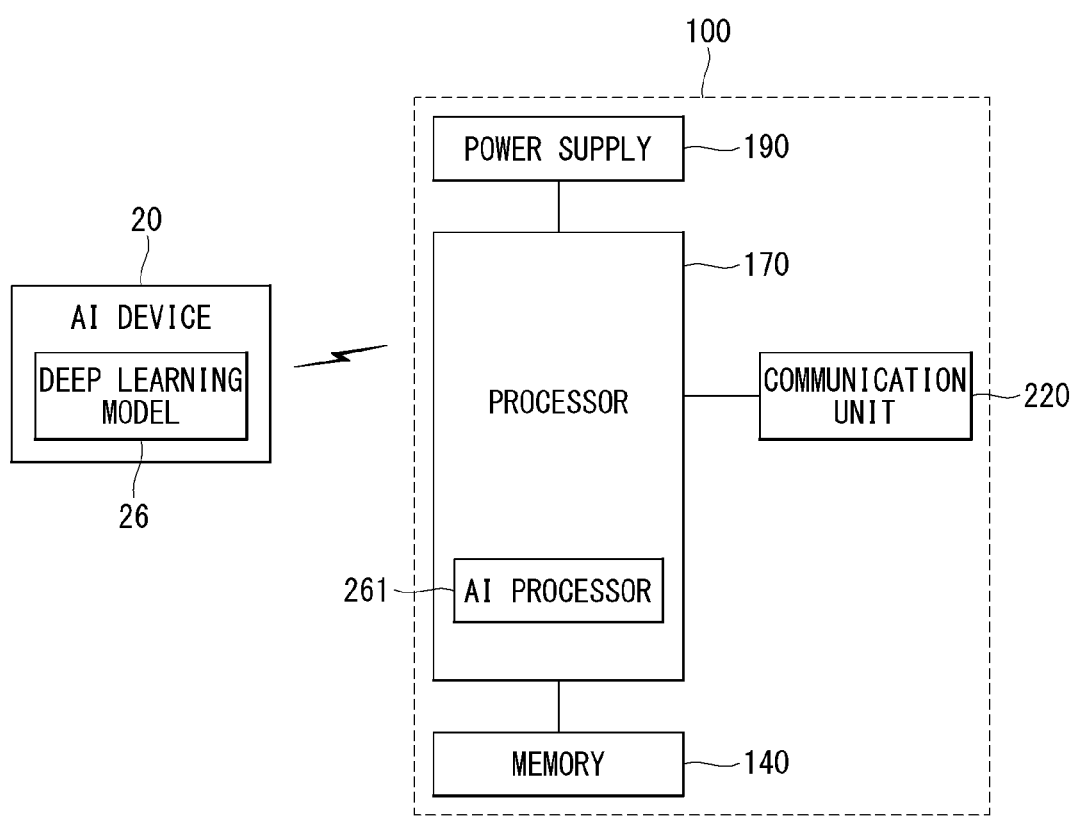
FIG. 6 is a diagram illustrating a system in which a home IoT server and an AI device according to an embodiment of the present disclosure are linked.

FIG. 6 is a diagram illustrating a system in which a home IoT server and an AI device according to an embodiment of the present disclosure are linked.

Referring to FIG. 6, a home IoT server 100 can transmit data that require AI processing to an AI device 20 through a communication unit and the AI device 20 including a neural network model 26 can transmit an AI processing result using the neural network model 26 to the home IoT server 100. The description of FIG. 5 can be referred to for the AI device 20.

The home IoT server 100 may include a memory 140, a processor 170, and a power supply 190 and the processor 170 may further include an AI processor 261. The processor 170 may be referred to as a main controller.

The home IoT server 100 may include an interface (not shown). The interface (not shown) can be configured using at least one of a communication module, a terminal, a pin, a cable, a port, a circuit, an element and a device.

The memory 140 is electrically connected with the processor 170. The memory 140 can store basic data about home IoT devices, control data for operation control of home IoT devices, and input/output data. The memory 140 can store data processed in the processor 170. Hardware-wise, the memory 140 may be configured using at least one of a ROM, a RAM, an EPROM, a flash drive, and a hard drive. The memory 140 can store various types of data for the overall operation of the home IoT server 100, such as a program for processing or control of the processor 170. The memory 140 may be integrated with the processor 170. Depending on embodiments, the memory 140 may be classified as a lower configuration of the processor 170.

Further, the memory 140 can store an internal image, a surrounding image, a safety signal, or a warning signal.

The power supply 190 can supply power to the home IoT server 100. The power supply 190 can be provided with power from a power source (e.g., a battery) included in the home IoT server 100 and can supply the power to each module of the home IoT server 100.

The processor 170 can be electrically connected to the memory 140, the interface, and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal, and provide the signal while power is supplied thereto by the power supply 190.

The processor 170 can receive information from home IoT devices connected with the home IoT server 100. The processor 170 can provide control signals to home IoT devices connected with the home IoT server through the interface.

The processor 170 can set some space and a surrounding space as a dangerous space on the basis of an internal image transmitted through the communication unit 220 and can acquire approach information related to a situation in which a person included in a predetermined range approaches the set dangerous space. The processor can apply the approach information to a danger-possible situation determination classification model learned in advance, determine whether the situation in which the approach information has been recognized is a dangerous situation on the basis of the applying result, and generate a safety signal or a warning signal on the basis of the determining result.

The home IoT server 100 may include at least one printed circuit board (PCB). The memory 140, the interface, the power supply 190, and the processor 170 may be electrically connected to the PCB.

Hereafter, a home IoT device and an AI processor 261 that are connected with the home IoT server 100 are described in more detail.

Meanwhile, the home IoT server 100 transmits the approach information to the AI device 20 through the communication unit 220 and the AI device 20 can transmit AI processing data generated by applying the neural network model 26 to the transmitted data to home IoT server 100. The home IoT server 100 can recognize the probability that the current situation is a danger-possible situation requiring to control the home IoT device and reflect a warning signal characteristic on the basis of the received AI-processed data, can control the operation of the home IoT device on the basis of the probability of a danger, and can reflect a corresponding warning signal.

The communication unit 220 can exchange signals with a home IoT device positioned in a space in a home or a smartphone or a smart device positioned in a space outside the home. The communication unit 220 can exchange signals with at least any one of an infrastructure (e.g., a server and a broadcast station), a home IoT device, a smartphone, and a smart device. The communication device 220 may include a transmission antenna, a reception antenna, and at least one of a radio frequency (RF) circuit and an RF element which can implement various communication protocols in order to perform communication.

The communication unit 220 can receive internal images or surrounding images from a plurality of cameras, can transmit a control signal or a safety signal to a plurality of home IoT devices, and can transmit a warning signal to a registered user. The communication unit 220 can transmit a safety signal to some home IoT devices to control the operations of the some home IoT devices or can transmit a warning signal to a registered user under control by the processor 170.

Meanwhile, the AI processor 261 can recognize the probability that the current situation is a danger-possible situation requiring to control the home IoT device and reflect a warning signal characteristic, using approach information transmitted from each home IoT device, can control the operation of the home IoT device on the basis of the probability of a danger, and can generate a corresponding warning signal.

According to an embodiment of the present disclosure, the communication unit 220 can acquire approach information. The communication unit 220 can transmit the acquired approach information to the processor 170.

According to an embodiment of the present disclosure, the processor 170 can calculate the probability that the current situation is a danger-possible situation, using the approach information transmitted from the communication unit 220. The processor 170 can determine whether to transmit a safety signal to a home IoT device or a warning signal to a registered user on the basis of the probability that the current situation is a danger-possible situation.

In the above, 5G communication for implementing a home monitoring system according to an embodiment of the present disclosure and a rough configuration for performing AI processing and for transmitting the AI processing result by applying the 5G communication were described.

Hereafter, a home monitoring system that can prevent a safety accident when a child or a pet approaches a dangerous space or a home IoT device, by sensing it, controlling the home IoT device, and making a user recognize it is described in detail with reference to FIGS. 7 to 14.

Figure 7:
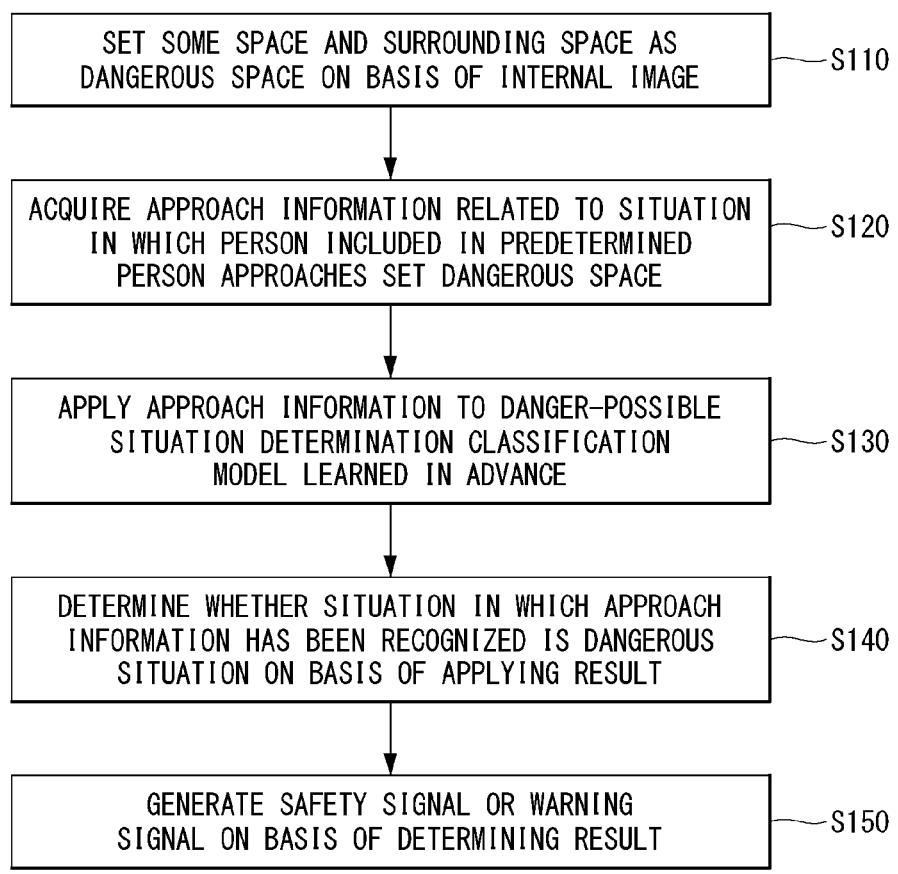
FIG. 7 is a diagram simply illustrating the operation of a home monitoring system according to an embodiment of the present disclosure.

FIG. 7 is a diagram simply illustrating the operation of a home monitoring system according to an embodiment of the present disclosure.

Referring FIG. 7, a home IoT server 100 according to an embodiment of the present disclosure may include a main controller 170.

The main controller 170 can set some space and a surrounding space as a dangerous space on the basis of an internal image. The main controller 170 can set a portion of an internal space as a dangerous space or a surrounding space of a plurality of home IoT devices on the basis of internal images photographed by a plurality of cameras or an internal draft.

The main controller 170 can acquire approach information related to a situation in which a person included in a predetermined range approaches the set dangerous space.

The main controller 170 can apply the approach information to a danger-possible situation determination classification model learned in advance.

The main controller 170 can determine whether the situation in which the approach information has been recognized is a dangerous situation on the basis of the applying result.

The main controller 170 can generate a safety signal or a warning signal on the basis of the determining result.

For example, when a window is closed and locked, the main controller 170 may not set some space as a dangerous space, and when a window is unlocked and open, the main controller 170 may set some space as a dangerous space. When a window is locked and is not set as a dangerous space and a person included in a predetermined range touches or unlocks the window, the main controller 170 can reset some space as a dangerous space and generate a warning signal.

Figure 8:
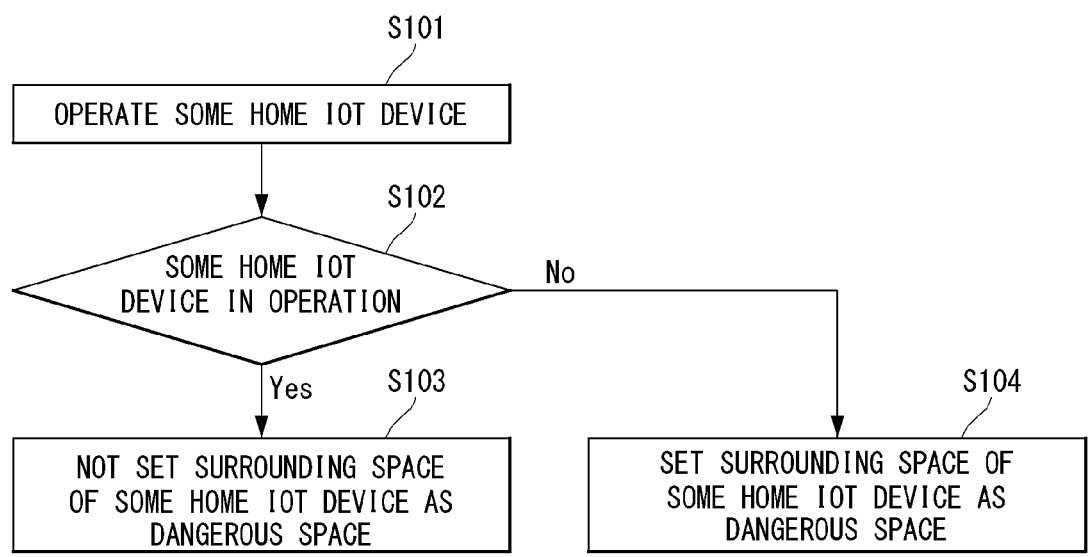
FIG. 8 is a diagram illustrating that a home monitoring system according to an embodiment of the present disclosure sets a dangerous space in accordance with the operation of a home IoT device.

FIG. 8 is a diagram illustrating that a home monitoring system according to an embodiment of the present disclosure sets a dangerous space in accordance with the operation of a home IoT device.

Referring to FIG. 8, the main controller 170 can determine whether to set a dangerous space, depending on operations of some home IoT devices.

The main controller 170 is electrically connected with a plurality of home IoT devices and can check whether the home IoT device operate (S101).

When some home IoT devices are operated (S102), the main controller 170 can set the surrounding spaces of some home IoT devices as dangerous spaces (S103). For example, the dangerous spaces that are some spaces may include spaces where some home IoT devices are installed and a space where a window is installed. Some home IoT devices may include one of an electric range, a gas stove, a dish washing machine, an oven, and a washing machine.

When some home IoT devices are not operated (S102), the main controller 170 may not set the surrounding spaces of some home IoT devices as a dangerous space (S104).

Figure 9:
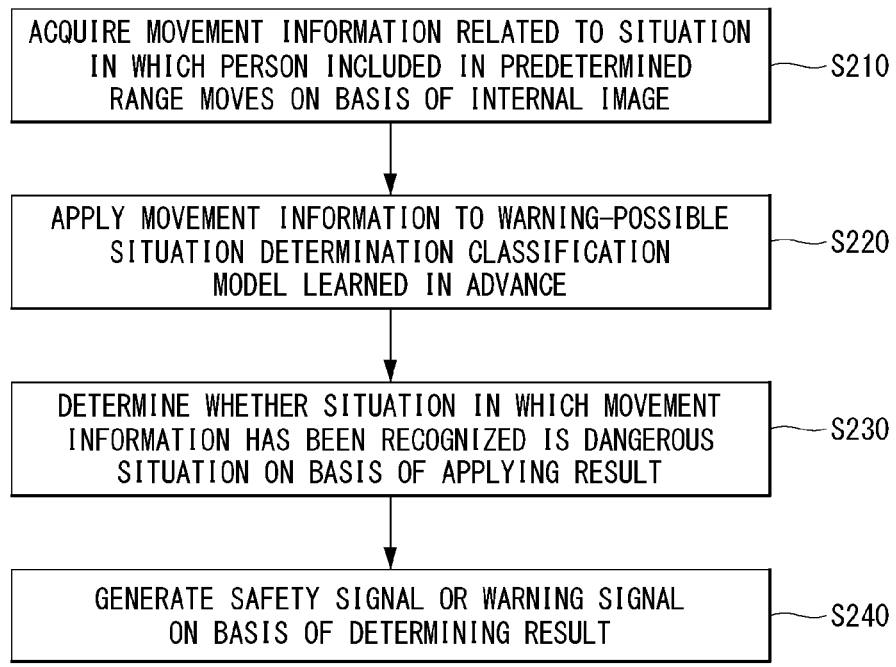
FIG. 9 is a flowchart of the home monitoring system according to an embodiment of the present disclosure.

FIG. 9 is a flowchart of the home monitoring system according to an embodiment of the present disclosure.

Referring to FIG. 9, the main controller can acquire movement information related to a situation in which a person included in a predetermined range moves on the basis of an internal image, and can extract a feature value from the acquired movement information (S210).

For example, the main controller 170 can receive movement information from at least one sensor (e.g., a sensing sensor). The main controller 170 can extract a feature value from the movement information. The feature value may be calculated as a value that is shown in detail through a movement pattern of a user who moves in an internal space from at least one feature that can be extracted from the movement information.

The main controller 170 can control feature values to be input to an artificial neural network (ANN) classifier trained to determine a dangerous situation or a warning situation (S220).

The main controller 170 can generate a dangerous situation or warning situation state by combining extracted feature values. The dangerous situation or warning situation state may be input to the artificial neural network (ANN) classifier trained to determine a dangerous situation or a warning situation on the basis of extracted feature values. The artificial neural network classifier may be referred to as a warning-possible situation determination classification model.

The main controller 170 can analyze an output value of the artificial neural network (S820) and can determine whether it is a warning situation or a dangerous situation on the basis of the output value of the artificial neural network (S830).

The main controller 170 can recognize whether the situation related to the movement information is a dangerous situation or a warning situation from output of the artificial neural network classifier.

On the other hand, although an example that is implemented by processing of the main controller 170 that determines a dangerous situation through AI processing was described with reference to FIG. 9, the present disclosure is not limited thereto. For example, AI processing may be performed on a 5G network on the basis of sensing information received from the main controller.

The main controller 170 can generate a safety signal or the warning signal on the basis of determination result (S240). For example, when determining that it is a dangerous situation as the result of observing movement information about a user, the main controller 170 can generate a safety signal or a warning signal.

Thereafter, the main controller 170 can transmit the generated safety signal or warning signal to a portable device or a smart device of a registered user. The warning signal may include voices of the registered user stored in a storage unit. The registered user may be defined as a user whose phone number about a portable device has been registered on a home IoT server.

Alternatively, the main controller 170 can induce a person included in a predetermined range to get out of a dangerous situation by forcibly operating a predetermined preferring IoT device together with the generated safety signal or warning signal. For example, the person included in a predetermined range may include a child, an old person, or a weak person.

Figure 10:
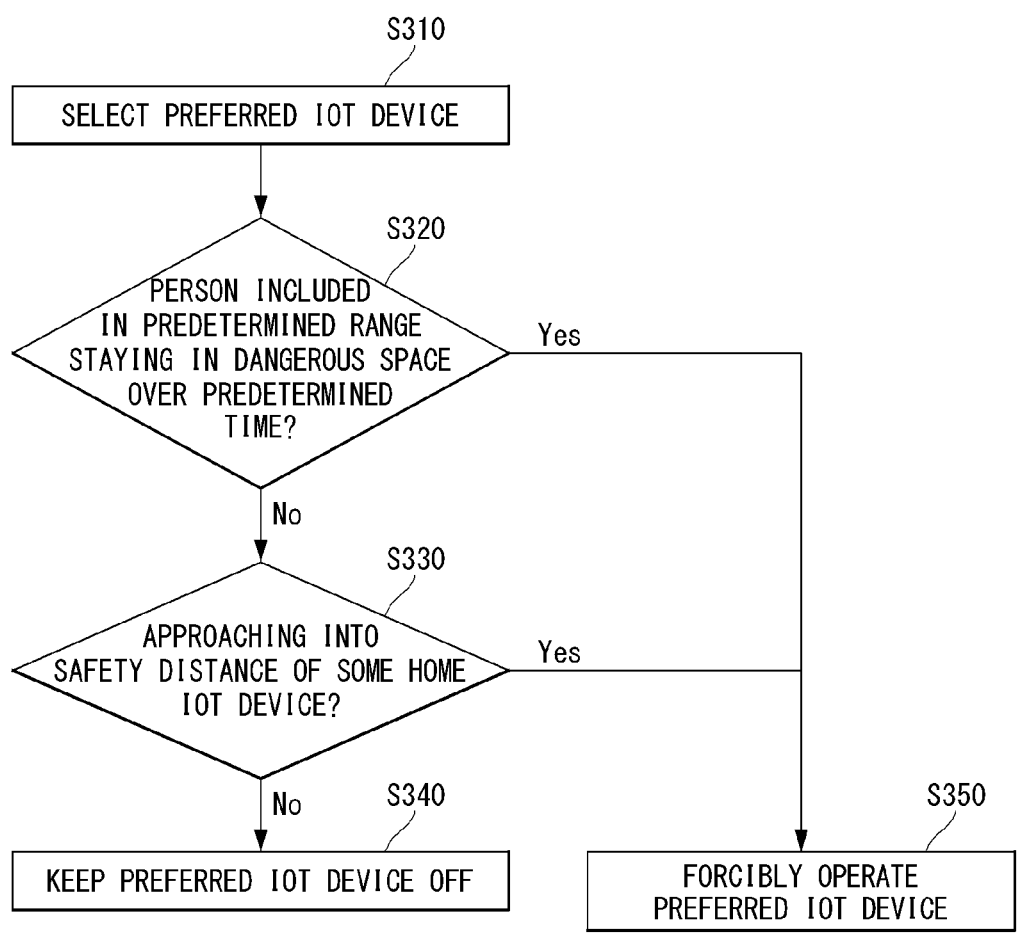
FIG. 10 is a diagram illustrating that a home monitoring system according to an embodiment of the present disclosure sets a preferring IoT device.

FIG. 10 is a diagram illustrating that a home monitoring system according to an embodiment of the present disclosure sets a preferred IoT device.

Referring to FIG. 10, the main controller 170 can select some home IoT devices, which a person included in a predetermined range frequency uses, as preferring IoT devices.

The main controller 170 can select one of home IoT devices, which a person included in a predetermined range uses at least three or more times a day, as a preferred IoT device on the basis of an internal image (S310). Although it was described to select one of home IoT devices that are used at least three or more times a day as a preferred IoT device, the present disclosure is not limited thereto. The main controller may select preferred IoT devices in proportion to the time for which a person included in a predetermined range uses the home IoT devices through an internal image.

The main controller 170 can determine whether a person included in a predetermined range stays in a dangerous space over a predetermined time (S320). When the person included in a predetermined range stays in the dangerous space over a predetermined time, the main controller 170 can forcibly turn on and operate a preferred IoT device (S350).

The main controller 170 can determine approach into safety distances of some home IoT devices (S330). When sensing approach into safety distances of some home IoT devices, the main controller 170 can forcibly turn on and operate a preferred IoT device (S350).

When the person included in a predetermined range stays in the dangerous space under a predetermined time or does not approach into safety distances of some home IoT devices, the main controller 170 can keep the preferred IoT device off (S340).

When a baby, a child, an old person, etc. are positioned in a dangerous space, the main controller 170 can attract their interest or gaze to the preferred IoT device by forcibly turning on the preferred IoT device. Accordingly, the main controller 170 induces the baby, child, old person, etc. to get out of the dangerous space and move around the preferred IoT device, thereby being able to preclude safety accidents of them.

Figure 11:
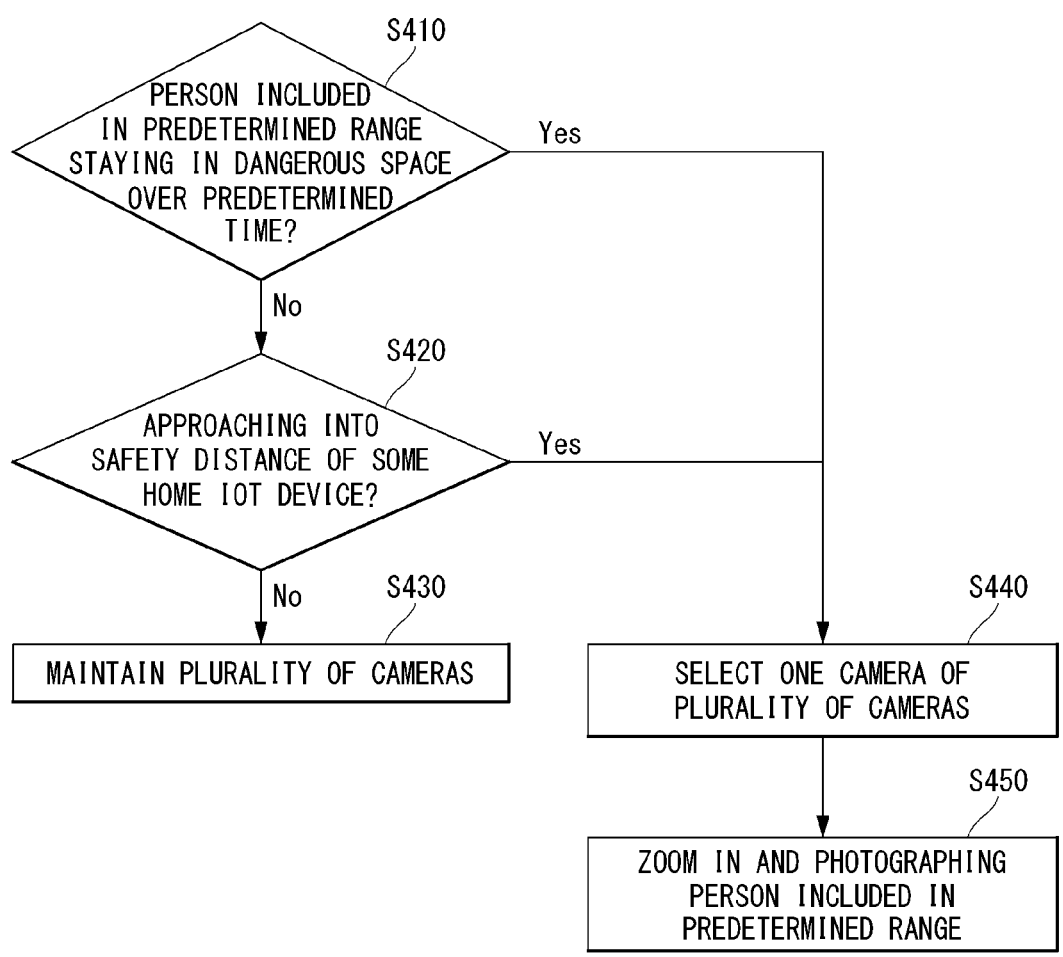
FIG. 11 is a diagram illustrating that a home monitoring system according to an embodiment of the present disclosure photographs a person included in a predetermined range.

FIG. 11 is a diagram illustrating that a home monitoring system according to an embodiment of the present disclosure photographs a person included in a predetermined range.

Referring to FIG. 11, when a person included in a predetermined range is positioned in a dangerous space, the main controller 170 can zoom in and photograph the person.

The main controller 170 can determine whether the person included in a predetermined range stays in the dangerous space over a predetermined time (S410). When the person included in a predetermined range stays in a dangerous space over a predetermined time, the main controller 170 can select one camera of a plurality of cameras (S350). The main controller 170 can preferentially select a camera close to the dangerous space from the plurality of cameras. Alternatively, the main controller 170 can preferentially select a camera close to the person included in the predetermined range from the plurality of cameras.

The main controller 170 can determine approach into safety distances of some home IoT devices (S330). When sensing approach into safety distances of some home IoT devices, the main controller 170 can select one camera of a plurality of cameras (S440).

The main controller 170 can focus on and photograph the person included in the predetermined range and positioned in the dangerous space by controlling the selected camera. The main controller 170 can focus the person included in the predetermined range, can zoom in and photograph the person, and can store the image, depending on the surrounding situation.

Figure 12:
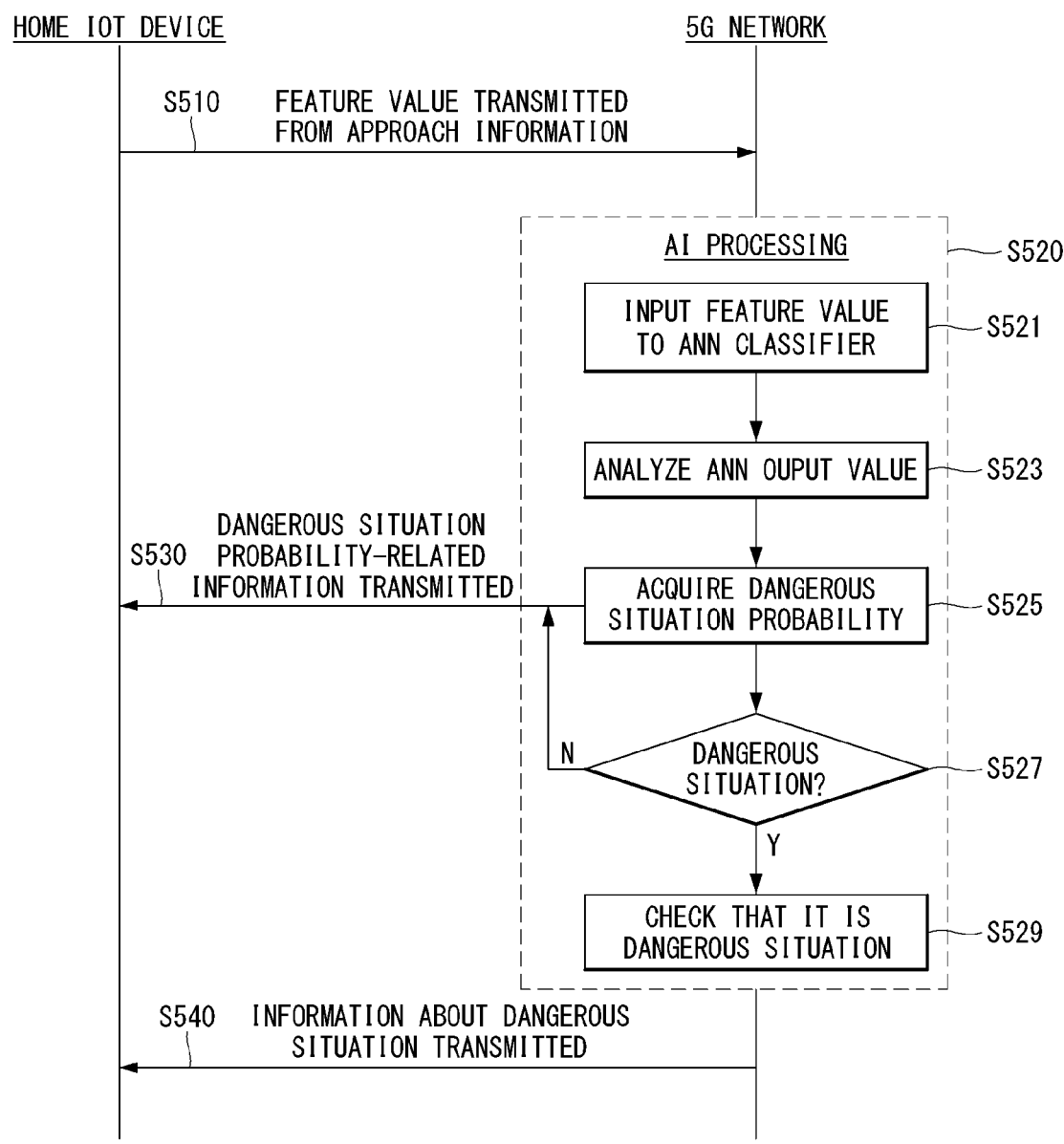
FIG. 12 is a flowchart showing a method of determining a dangerous situation using a 5G network.

FIG. 12 is a flowchart showing a method of determining a dangerous situation using a 5G network.

As shown in FIG. 12, the processor 170 can control the communication unit 220 to transmit a feature value of approach information to an AI processor included in a 5G network. Further, the processor 170 can control the communication unit to receive AI-processed information from the AI processor.

The AI-processed information may include dangerous situation probability information or a dangerous situation probability value for determining whether the situation in which the approach information has been recognized is a dangerous situation.

Meanwhile, the processor of the home IoT server can perform a procedure of initial connection with the 5G network in order to transmit information related to the situation in which the approach information has been recognized to the 5G network. The processor of the home IoT server can perform the procedure for initial connection with the 5G network on the basis of an SSB (Synchronization signal block).

Further, the processor of the home IoT server can receive DCI (Downlink Control Information) that is used to schedule transmission of information related to the situation in which the approach information has been recognized from a network through a wireless communication unit.

The processor 170 can transmit recognition situation information about the approach information to the network on the basis of the DCI.

The recognition situation information about the approach information is transmitted to the network through a PUSCH, and DM-RS of the SSB and the PUSCH can undergo QCK for a QCL type D.

Referring to FIG. 12, the processor of the home IoT server can transmit a feature value extracted from the recognition situation information about the approach information to the 5G network (S510).

Here, the 5G network may include an AI processor or an AI system and the AI system of the 5G network can perform AI processing on the basis of received sensing information (S520).

The AI system can input feature values received from the home IoT server to an ANN classifier (S1911). The AI system can analyze an ANN output value (S1913) and can acquire a probability value that the recognition situation about the current approach information is a danger-possible situation from the ANN output value (S1915). The 5G network can transmit the probability value that it is a danger-possible situation determined by the AI system to the home IoT server through a wireless communication unit.

When determining that the recognition situation about the current approach information is a danger-possible situation (S1917), the AI system can check whether the situation in which the current approach information has been recognized is a danger-possible situation requiring to transmit a safety signal to a home IoT device and transmitting even a warning signal to a registered user (S1919) and can transmit a signal for controlling the home IoT device to the home IoT server by transmitting a safety signal together with warning signal to the home IoT device (S540).

Further, when it is determined that it is not a danger-possible situation, the AI system can transmit the probability value that it is a danger-possible situation to the processor of the home IoT server (S530) and the processor of the home IoT server can determine whether the recognition information about the current approach information is a danger-possible situation by analyzing the probability value that it is a danger-possible situation.

Meanwhile, the processor of the home IoT server may transmit only recognition situation information about approach information and may extract a feature value corresponding to input to be used as input of an artificial neural network for determining whether it is a danger-possible situation from recognition situation information about approach information in an AI system included in a 5G network.

Figure 13:
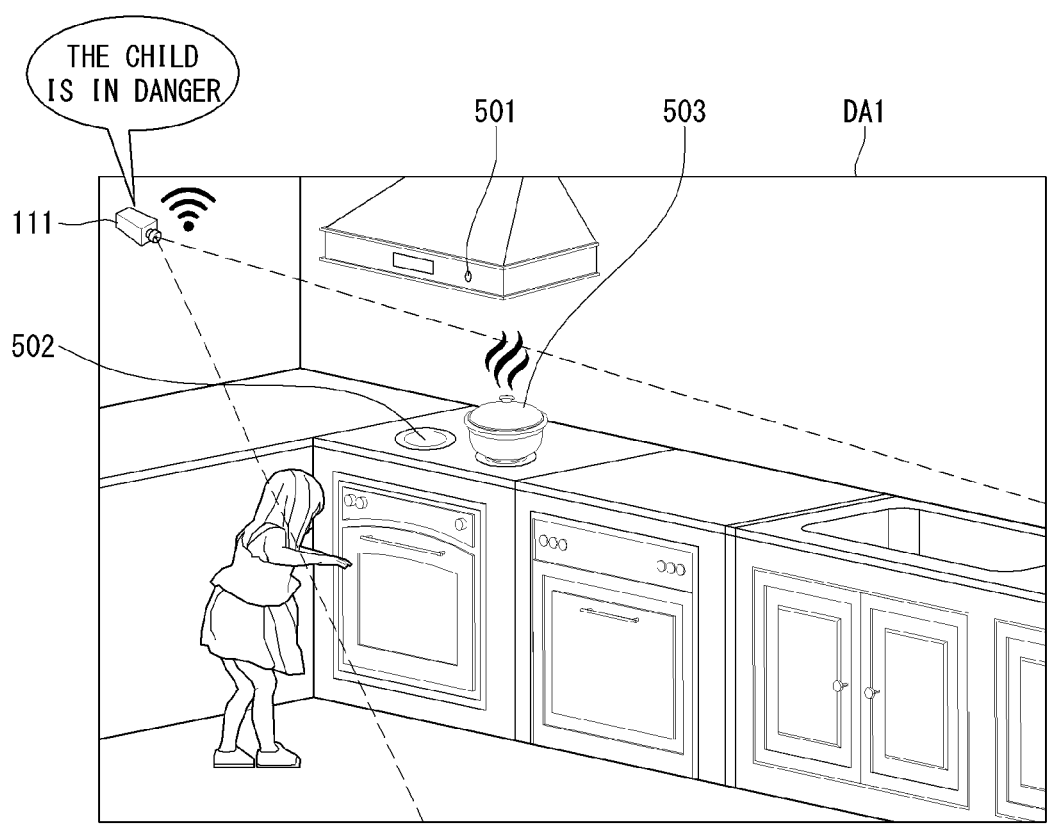
FIGS. 13 to 15 are views illustrating various examples of a home monitoring system according to an embodiment of the present disclosure.
Figure 14:
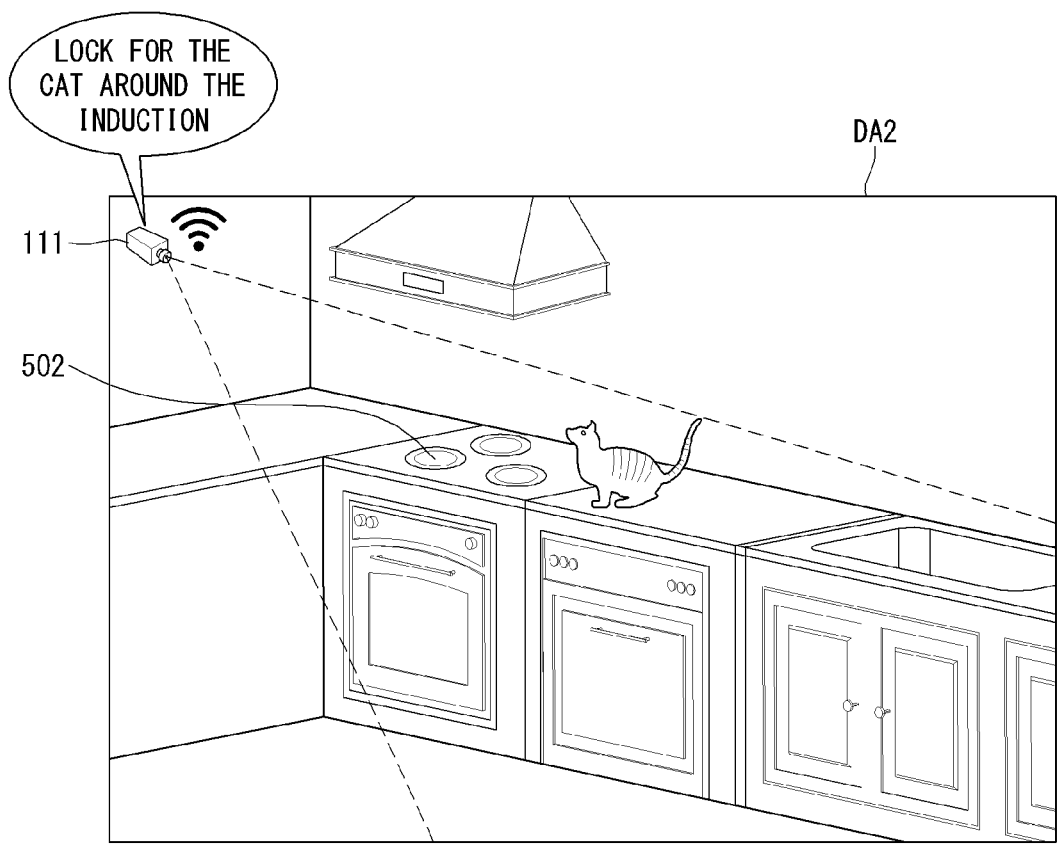
Figure 15:
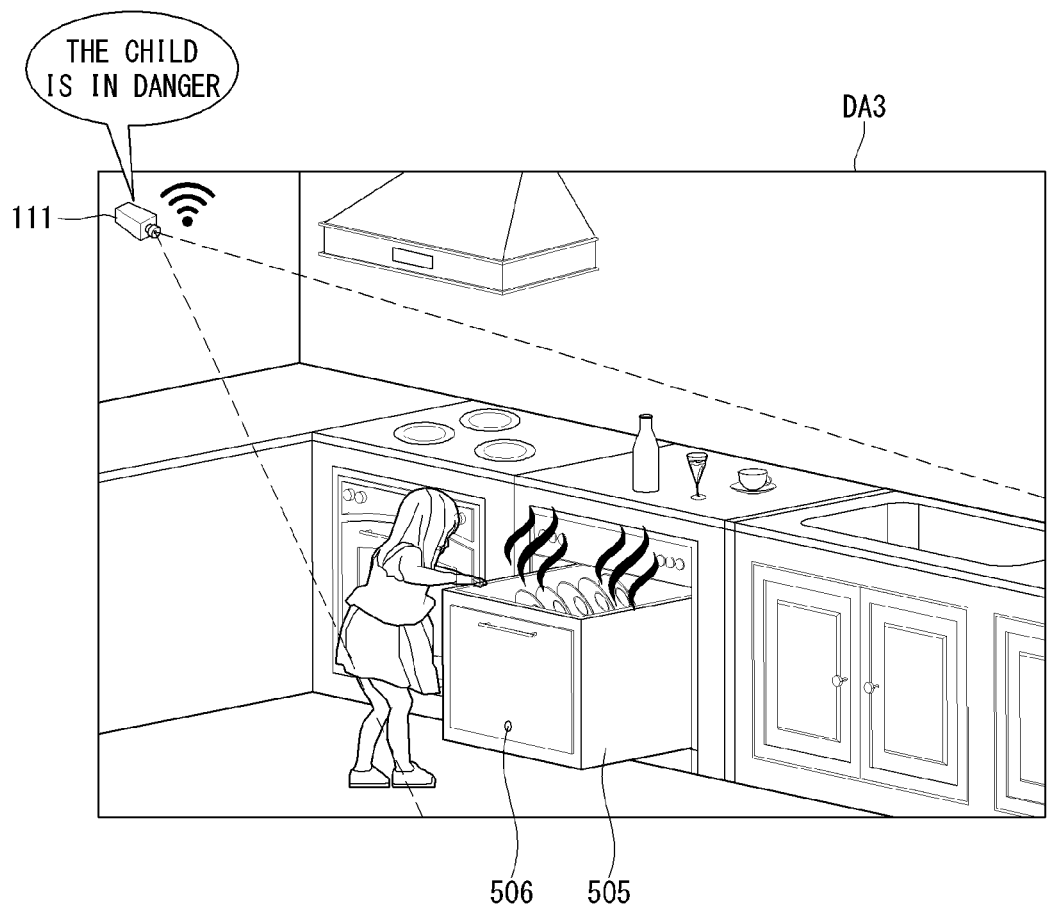

FIGS. 13 to 15 are views illustrating various examples of a home monitoring system according to an embodiment of the present disclosure.

Referring to FIG. 13, the main controller 170 can sense that food 503 is being cooked from an induction 502 or a temperature measurement device 501 disposed around the induction 502. The main controller 170 can set the kitchen in which the food 503 is being cooked on the induction 502 as a dangerous space DA1.

When a child approaching the set dangerous space DA1 is sensed through a plurality of camera 111, the main controller 170 can recognize a danger-possible situation and can generate a warning signal on the basis of a learned result. The warning signal can be transmitted to a portable device of a registered user through a communication unit under control of the main controller 170.

Alternatively, the main controller 170 can induce the child to get out of the dangerous space DA2 by forcibly operating a preferred IoT device that the child prefers.

Referring to FIG. 14, when all people went out and there is only a pet in a home, the main controller 170 can set a kitchen where the induction 502 is as a dangerous space DA2.

When the pet approaching the set dangerous space DA2 is sensed through a plurality of camera 111, the main controller 170 can recognize a danger-possible situation, can change the induction 502 into a locked mode, and can generate a warning signal on the basis of a learned result. The main controller 170 can prevent operation of the induction due to touch by the pet by changing the induction 502 into a locked mode.

The warning signal can be transmitted to a portable device of a registered user through a communication unit under control of the main controller 170.

The warning signal may include a file recorded with a user's voice. For example, the warning signal may be a user's voice such as "Coco, don't go there" or "Coco, come here".

Alternatively, the main controller 170 may store sounds that the pet dislikes or is afraid of, as the warning signal. The main controller 170 can induce the pet to get out of the dangerous space DA2 by outputting the warning signal.

Referring to FIG. 15, when a dish washing machine is being operated, the main controller 170 can recognize the operation and can set a utility room or a kitchen where the dish washing machine is installed as a dangerous space DA3.

The dish washing machine may be equipped with an approach sensor. For example, when the main controller 170 set a surrounding space of the dish washing machine as a dangerous space, the approach sensor mounted on the dish washing machine or the induction can be turned on and operated.

When a child not photographed by a plurality of cameras approaches, the approach sensor can sense the child and provide a sensing signal to the main controller 170.

When receiving the sensing signal, the main controller 170 can photograph in real time the child positioned in the dangerous space DA3 using the plurality of cameras 111.

Thereafter, when keeping recognizing the danger-possible situation, the main controller 170 can change the dish washing machine into a locked mode on the basis of a learned result. Alternatively, the main controller 170 can delay the time when hot steam generated from the dish washing machine is discharged. The main controller 170 can generate a warning signal. The warning signal can be transmitted to a portable device of a registered user through a communication unit under control of the main controller 170.

Alternatively, the main controller 170 can induce the child to get out of the dangerous space by forcibly operating a preferring IoT device that the child prefers.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

Effects of the home monitoring system according to the present disclosure are described hereafter.

When a child or an animal approaches a predetermined dangerous space and a home IoT device, the present disclosure senses it, safely controls the home IoT device, and makes a user recognize it in real time, thereby being able to expect prevention of a safety accident and continuous safety management in a home.

When a child or an animal approaches a predetermined dangerous space and a home IoT device, the present disclosure senses it and operates another surrounding home IoT device, thereby being able to induce the child or the animal to move to a safe space.

Further, the present disclosure can be useful to secure safety for residents who have weak perception ability such as a child, an old person, a weak person, and an impaired person.

What is claimed is:

1. A monitoring system comprising:
a plurality of Internet of Things (IoT) devices located at a designated space;
a plurality of cameras configured to capture images of the designated space including the plurality of IoT devices; and
an IoT server configured to:
receive, from the plurality of cameras, first images of the designated space and second images of areas respectively adjacent to the plurality of IoT devices;
transmit control signals to the plurality of IoT devices;
set a first space adjacent to at least one IoT device and a second space included in the designated space as a dangerous space based the first images and the second images;
control the at least one IoT device by transmitting a safety signal to the at least one IoT device; and
transmit a warning signal to a device associated with a registered user in response to sensing a person or animal within a predetermined range of the dangerous space based on the first images,
wherein the IoT server comprises:
a storage configured to store at least one of the first images, the second images, the safety signal, or the warning signal;
a transceiver configured to:
receive the first images and the second images from the plurality of cameras;
transmit the control signals and the safety signal to the plurality of IoT devices; and
transmit the warning signal to the device associated with the registered user; and
a controller configured to:
set the first space and the second space as the dangerous space;
acquire information related to a situation in which the person or animal is within the predetermined range of the set dangerous space or approaching the set dangerous space;
apply the acquired information to a possibly dangerous situation determination classification model learned in advance;
determine whether the situation is a dangerous situation based on an outcome of the information applied to the possibly dangerous situation determination classification model;
generate at least one of the safety signal or the warning signal based on a result of the determination based on the outcome; and
cause the transceiver to transmit the safety signal to the at least one IoT device to control operation of the at least one IoT device or transmit the warning signal to the device associated with the registered user.

2. The monitoring system of claim 1, wherein the controller is further configured to determine whether to set the dangerous space based on whether the at least one IoT device is being operated.

3. The monitoring system of claim 2, wherein the controller is further configured to:
not set the first space as a dangerous space when the at least one IoT device is not operated; and
set the first space as the dangerous space when the at least one IoT device is operated.

4. The monitoring system of claim 3, wherein the at least one IoT device comprises an electric range, a gas stove, a dish washing machine, an oven, or a washing machine.

5. The monitoring system of claim 4, wherein the second space comprises a space where the at least one IoT device is located and a space where a window is installed.

6. The monitoring system of claim 1, wherein the person comprises a child or an old or weak person.

7. The monitoring system of claim 1, wherein the controller is further configured to:
acquire movement information based on the first images when the person or animal located within the predetermined range moves;
apply the acquired movement information to a possibly warning situation determination classification model learned in advance;
determine whether the situation in which the movement information is recognized is a warning situation based on an outcome of the movement information applied to the possibly warning situation determination classification model; and
generate at least one of the safety signal or the warning signal based on a result of the determination based on the outcome.

8. The monitoring system of claim 1, wherein the controller is further configured to:
select one of the plurality of IoT devices that is used by the person at least three or more times a day as a preferred IoT device based on the first images; and
cause the preferred IoT device to forcibly operate when the person is in the predetermined range of the dangerous space for more than a threshold period of time or when the person approaches a safety distance of the at least one IoT device.

9. The monitoring system of claim 8, wherein the controller is further configured to:
select one of the plurality of cameras; and
cause the selected camera to zoom in and capture an image of the person within the predetermined range.

10. The monitoring system of claim 1, wherein the warning signal includes a voice of the registered user stored in the storage.

11. The monitoring system of claim 1, wherein a phone number corresponding to the device associated with the registered user is registered with the IoT server.

12. The monitoring system of claim 1, wherein:
the possibly dangerous situation determination classification model is stored in an Artificial Intelligence (AI) device; and
the controller is further configured to:
cause the transceiver to transmit a feature value related to information related to the situation to the AI device; and
acquire a result of the application of the information related to the situation to the possibly dangerous situation determination classification model from the AI device.

13. The monitoring system of claim 1, wherein:
the possibly dangerous situation determination classification model is stored in a network; and
the controller is further configured to:
cause the transceiver to transmit information related to the situation to the network; and
acquire, from the network, a result of the application of the information related to the situation to the possibly dangerous situation determination classification model.

14. The monitoring system of claim 13, wherein the controller is further configured to cause the transceiver to:
receive Downlink Control Information (DCI) used to schedule transmission of the information related to the situation from the network; and
transmit the information related to the situation to the network based on the DCI.

15. The monitoring system of claim 14, wherein the controller is further configured to:
perform a procedure of initial connection with the network based on a Synchronization signal block (SSB); and
cause the transceiver to transmit the information related to the situation to the network through a physical uplink shared channel (PUSCH), and
wherein demodulation reference signals (DM-RS) of the SSB and the PUSCH have undergone quasi co-located (QCL) for a QCL type D.

16. The monitoring system of claim 14, wherein the controller is further configured to cause the transceiver to:
transmit the information related to the situation to an AI processor included in the network; and
receive AI-processed information from the AI processor, and
wherein the AI-processed information comprises dangerous situation probability information for determining whether the situation is a dangerous situation.

17. The monitoring system of claim 5, wherein the controller is further configured to determine whether to set the dangerous space based on a state of the window.

18. The monitoring system of claim 17, wherein the controller is further configured to:
not set the second space as the dangerous space when the window is closed and locked; and
set the second space as the dangerous space when the window is open and unlocked.

19. The monitoring system of claim 18, wherein the controller is further configured to reset the second space as the dangerous space and generate the warning signal when the window is locked and is not set as the dangerous space and when the person or animal touches or unlocks the window.

* * * * *